United States Patent [19]

Ohtani et al.

[11] Patent Number: 4,696,635
[45] Date of Patent: Sep. 29, 1987

[54] APPARATUS FOR FORMING UNEVENNESS ON AN OUTER SURFACE OF A SYNTHETIC RESIN-COATED STEEL PIPE

[75] Inventors: Teruo Ohtani; Toshihisa Tamura; Yuji Ikeda; Mutsuya Araikawa; Kazuyoshi Kywata, all of Aichi Pref., Japan

[73] Assignee: Kawasaki Steel Corporation, Kobe, Japan

[21] Appl. No.: 862,165

[22] Filed: May 9, 1986

Related U.S. Application Data

[63] Continuation of Ser. No. 712,451, Mar. 13, 1985, abandoned, which is a continuation of Ser. No. 474,549, Mar. 11, 1983, abandoned.

[30] Foreign Application Priority Data

Mar. 16, 1982 [JP] Japan .................. 57-40258

[51] Int. Cl.⁴ .............................. B29C 59/02
[52] U.S. Cl. .................. 425/330; 264/293; 264/320; 425/385; 425/392; 425/397; 425/DIG. 218
[58] Field of Search ..... 425/392, 329, 330, DIG. 218, 425/385, 397; 264/293, 320

[56] References Cited

U.S. PATENT DOCUMENTS

| | | | |
|---|---|---|---|
| 452,204 | 5/1891 | Weiet | 425/329 |
| 2,175,099 | 10/1939 | Abbott | 264/284 |
| 2,867,001 | 1/1959 | Lewis et al. | 264/284 |
| 3,387,330 | 6/1968 | Lemelson | 425/385 |
| 3,470,286 | 9/1969 | Weber | 264/284 |

FOREIGN PATENT DOCUMENTS

| | | | |
|---|---|---|---|
| 2460018 | 7/1976 | Fed. Rep. of Germany | 425/385 |
| 51-73060 | 6/1976 | Japan | 264/284 |
| 53-86773 | 7/1978 | Japan | 264/209.3 |
| 78933 | 6/1981 | Japan . | |
| 6704726 | 10/1967 | Netherlands | 425/330 |
| 288020 | 5/1953 | Switzerland | 425/330 |

Primary Examiner—James Lowe
Attorney, Agent, or Firm—Balogh, Osann, Kramer, Dvorak, Genova & Traub

[57] ABSTRACT

In order to improve the bonding strength between a synthetic resin-coated steel pipe and concrete applied around the synthetic resin-coated steel pipe for weight coating or protection, unevenness formed of groove portions and ridge portions arranged alternately is formed on the outer surface of the synthetic resin-coated steel pipe by pressing the synthetic resin coating layer with a working tool having an uneven inner surface under a condition where at least one member of the working tool and the synthetic resin coating layer is kept at a temperature at which the synthetic resin is melted.

2 Claims, 5 Drawing Figures

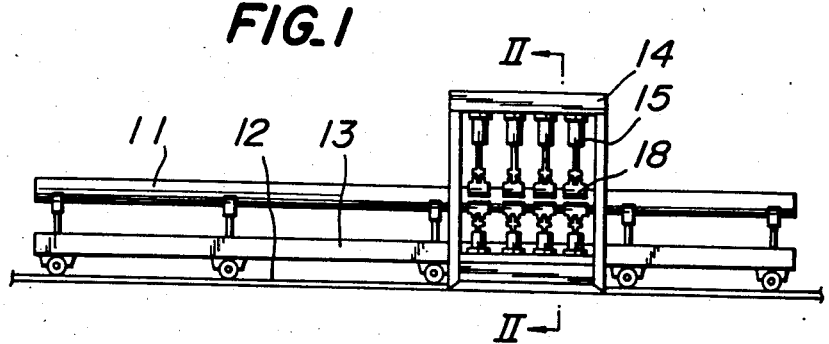
FIG_1
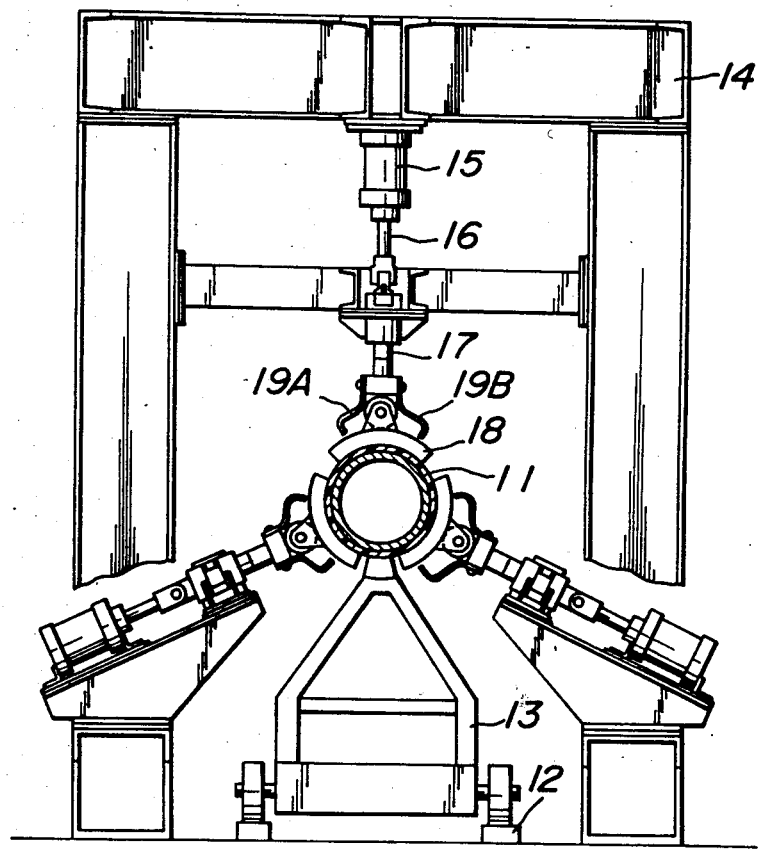
FIG_2

FIG_3
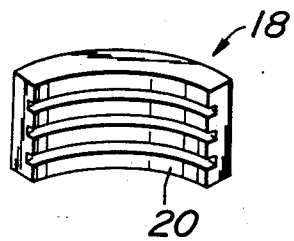
FIG_4
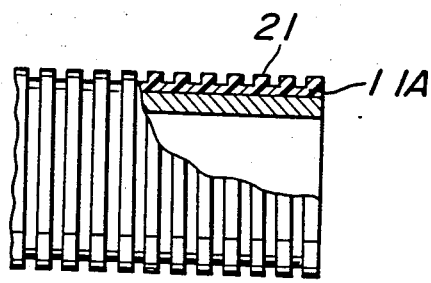
FIG_5
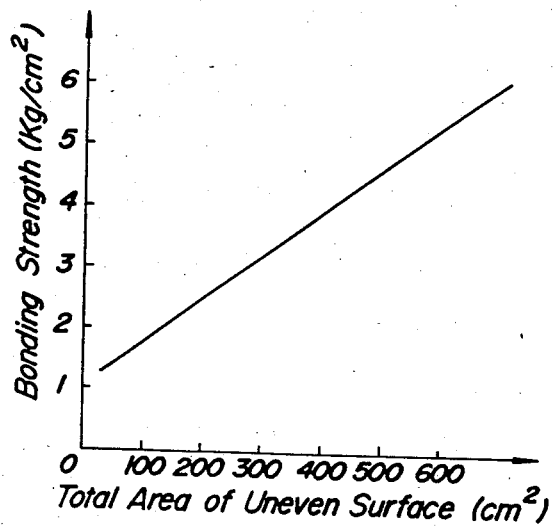

APPARATUS FOR FORMING UNEVENNESS ON AN OUTER SURFACE OF A SYNTHETIC RESIN-COATED STEEL PIPE

This application is a continuation of application Ser. No. 06/712,451, filed Mar. 13, 1985, and now abandoned, which was a continuation of application Ser. No. 06/474,549, filed Mar. 11, 1983 and now abandoned.

BACKGROUND OF THE INVENTION

The present invention relates to a method and an apparatus for forming "unevenness" on an outer surface of a synthetic resin-coated steel pipe.

The term "unevenness" used herein means unevenness formed of groove portions and ridge portions alternately arranged as shown in FIGS. 3 and 4 by numerals 20 and 21.

Synthetic resin-coated steel pipes, for example, are provided for marine bottom use by surrounding the outer surface of these pipes with concrete for the purpose of weight coating or protection. However, the synthetic resin-coated steel pipes are relatively hard and smooth on the outer surface, so that the bonding strength between the synthetic resin outer surface and the concrete surface is low. Accordingly, there is the possibility that the concrete surface and the synthetic resin outer surface may become separated owing to the external force acting in an axial direction of the steel pipe.

SUMMARY OF THE INVENTION

An object of the present invention is to provide a method and an apparatus for forming easily unevenness on an outer surface of a synthetic resin-coated steel pipe.

The above described object can be attained by keeping the temperature of a working tool having an inner surface having the above defined unevenness and/or a synthetic resin coating layer at a temperature capable of melting the synthetic resin and pressing the synthetic resin coating layer with the working tool to form the uneven surface on the synthetic resin coating layer.

An apparatus for forming the unevenness on the outer surface of the synthetic resin-coated steel pipe includes a working tool having the uneven inner surface formed of groove portions and ridge portions, which is provided with a heater therein and an urging means which presses the synthetic resin coating layer with the working tool.

BRIEF DESCRIPTION OF THE DRAWINGS

FIG. 1 is a side view showing an entire apparatus for forming the unevenness on the outer surface of the synthetic resin coating layer according to an example of the present invention;

FIG. 2 is a cross-sectional view of the apparatus taken along line II—III in FIG. 1;

FIG. 3 is a perspective view showing an uneven surface having grooves and ridges therebetween on the working tool in an example of the present invention;

FIG. 4 is a side view of a synthetic resin-coated steel pipe illustrating a part of the pipe in section, wherein the unevenness has been formed on the synthetic resin coating layer in the example; and FIG. 5 is a graph showing the relation of the bonding strength of the outer surface of the steel pipe in the example to the total surface area of the uneven surface of the synthetic resin coating layer.

DESCRIPTION OF THE PREFERRED EMBODIMENTS

FIG. 1 is a side view showing an entire apparatus for forming the unevenness according to an example of the present invention and FIG. 2 is a cross-sectional view of said apparatus taken along line II—II in FIG. 1. A synthetic resin-coated steel pipe 11 is held on a trolley 13 movably mounted on rails 12. At a middle position of the rails 12, a gate-formed frame 14 is arranged. At each of four positions in the frame 14 in the longitudinal direction of the steel pipe 11 transferred together with the trolley 13, three compressing cylinders 15 as an urging means are arranged in the peripheral direction of the steel pipe 11 at equal interval. A piston rod 16 of each compressing cylinder 15 orients to the center of the steel pipe 11 as shown in FIG. 2 and a top end portion of the piston rod 16 is connected to one end of a connecting member 17 with a pin and another end of the connecting member 17 is connected to a working tool 18 by which the uneven outer surface is formed on the synthetic resin coating layer, with a pin. The working tool 18 is supported with supporting members 19A and 19B made of leaf springs fixed to both sides of the connecting member 17 and the inner surface thereof is commensurate with the outer surface of the steel pipe 11. The working tool 18 is provided with a heater therein and heated to a temperature at which the synthetic resin coating layer 11A is melted, and has an uneven inner surface 20 as shown in FIG. 3.

Explanation will be made with respect to a manner for forming the uneven surface, characterized by groove portions and ridge portions, on the synthetic resin coating layer by means of the above described apparatus.

The uneven inner surface 20 having groove portions and ridge portions of the working member 18 is kept at a temperature, for example, 200° C.-250° C., at which the synthetic resin coating layer 11A of the steel pipe 11 is melted, by means of a heater housed in the working tool 18. The steel pipe 11 is transferred together with the trolley 13 and stopped in such a position that the outer surface of the steel pipe is opposite to the working tool 18. Then, a compressing cylinder 15 is driven and the uneven surface 20 of the working tool 18 is urged (for example, about 2 kg/cm²) to a surface of the synthetic resin coating layer 11A for several seconds and after the surface of the coating layer 11A has been softened, the projected portions on the working tool are pressed to the coating layer into a given depth to partially melt the synthetic resin coating layer 11A, whereby the form of the uneven surface 20 of the working tool 18 is transferred to the outer surface of the synthetic resin coating layer 11A. Thereafter, when the working tool 18 is returned back to the original position, the uneven surface on the coating layer 11A is solidified to form the uneven surface 21 on the outer surface of the synthetic resin-coated steel pipe.

In this example, the uneven surface 21 can be easily formed by pressing the synthetic resin coating layer 11A of the steel pipe 11 with the working tool 18 provided with a heater therein. The frictional force of the synthetic resin-coated steel pipe to earth ground (where the steel pipe 11 is piled), and the bonding strength of the synthetic resin-coated steel pipe to concrete (by which the outer surface of the steel pipe 11 is surrounded), and the like can be increased. Furthermore, the above described bonding strength increases in proportion to the increase of the total area of the uneven surface 21 as shown in FIG. 5.

In the above described example, explanation was made with respect to the case where a heater is provided in the working tool 18 and the working tool is kept at a temperature at which the synthetic resin is melted and the unevenness on the outer surface of the synthetic resin-coated steel pipe (according to the present invention) may be formed. However, the latter may be obtained by pressing the synthetic resin coating layer 11A having the given high temperature, as immediately after coating the synthetic resin on the steel pipe with a working tool having the uneven inner surface at room temperature.

As mentioned above, the method for forming the unevenness on the outer surface of the synthetic resin-coated steel pipe according to the present invention includes pressing the synthetic resin coating layer with the working tool (having the uneven inner surface) under the condition that the temperature of the working tool and/or the synthetic resin coating layer are kept at a temperature capable of melting the synthetic resin, whereby the uneven shape of the inner surface of the working tool is transferred to the synthetic resin coating layer.

The apparatus for forming the unevenness on the outer surface of the synthetic resin-coated steel pipe according to the present invention includes a working tool having the uneven inner surface which is provided with a heater therein and an urging means by which the working tool is pressed against the synthetic resin-coated steel pipe, so that the unevenness is easily formed on the outer surface of the synthetic resin-coated steel pipe by a simple apparatus.

What is claimed is:

1. Apparatus for forming an uneven outer groove and ridge surface on synthetic resin coated steel pipe, comprising a housing, moving-means for transporting said pipe, a plurality of urging means supported by said housing and directed toward the center of the pipe, working tool means flexibly connected to and supported by said urging means for contact engagement with the circumferential surface of said pipe, said working tool means being disposed longitudinally with respect to the pipe and having a concave inner surface in the shape of a cylindrical segment formed with a pattern of groove portions and ridge portions, heater means disposed within each of said working tool means, said working tool means having supporting leaf spring members connected to the urging means so that the working tool means flexibly conform to the curved surface of the pipe.

2. Apparatus as claimed in claim 1, wherein said working tool means comprise three equally spaced radially disposed tools.

* * * * *